Figure 1:
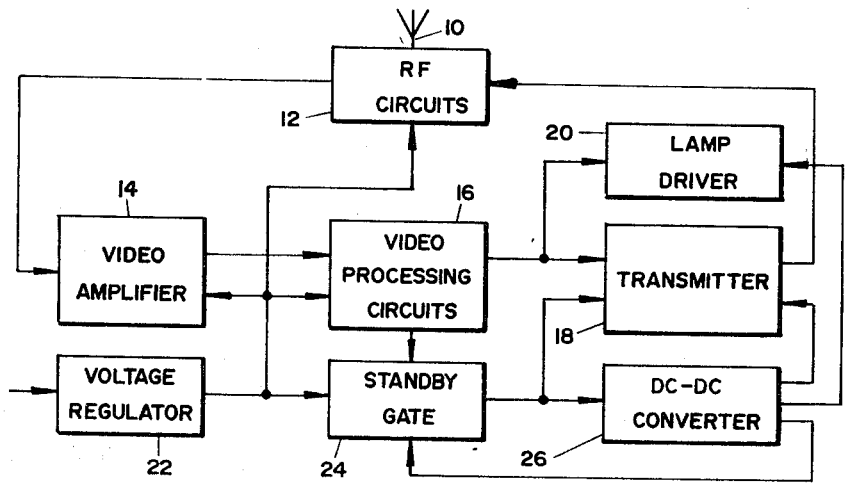

United States Patent

Kingsbury

[15] 3,656,159
[45] Apr. 11, 1972

[54] MINIMUM SIZE TRANSPONDER
[72] Inventor: Keith M. Kingsbury, Phoenix, Ariz.
[73] Assignee: Motorola, Inc., Franklin Park, Ill.
[22] Filed: Mar. 2, 1970
[21] Appl. No.: 15,730

[52] U.S. Cl. ..............................343/6.8 R, 307/260, 328/61
[51] Int. Cl. ........................................H03k 5/13, G01s 9/56
[58] Field of Search ................307/260, 265; 328/58, 60, 61; 343/6.8 R, 6.8 LC

[56] References Cited

UNITED STATES PATENTS 3,054,072  9/1962  Beaulieu et al. ...................307/260 X
3,383,680  5/1968  Diven ...............................343/6.8 LC
3,454,884  7/1969  Ziehm...................................328/61

Primary Examiner—Malcolm F. Hubler
Attorney—Mueller and Aichele

[57] ABSTRACT

A transponder of minimum size is disclosed which will, upon receipt of an interrogation, send out a pair of pulses with adjustable spacing, and in one adjustment thereof, will send out pulses continuously, while in another adjustment thereof it will send out pulses, one pulse transmitted for one pulse received. The minimum size of the transponder is attained in part by combining the functions of parts of a known transponder in circuits of minimum size.

8 Claims, 5 Drawing Figures

INVENTOR.
Keith M. Kingsbury
BY
Mueller, Aichele, & Rauner
attys

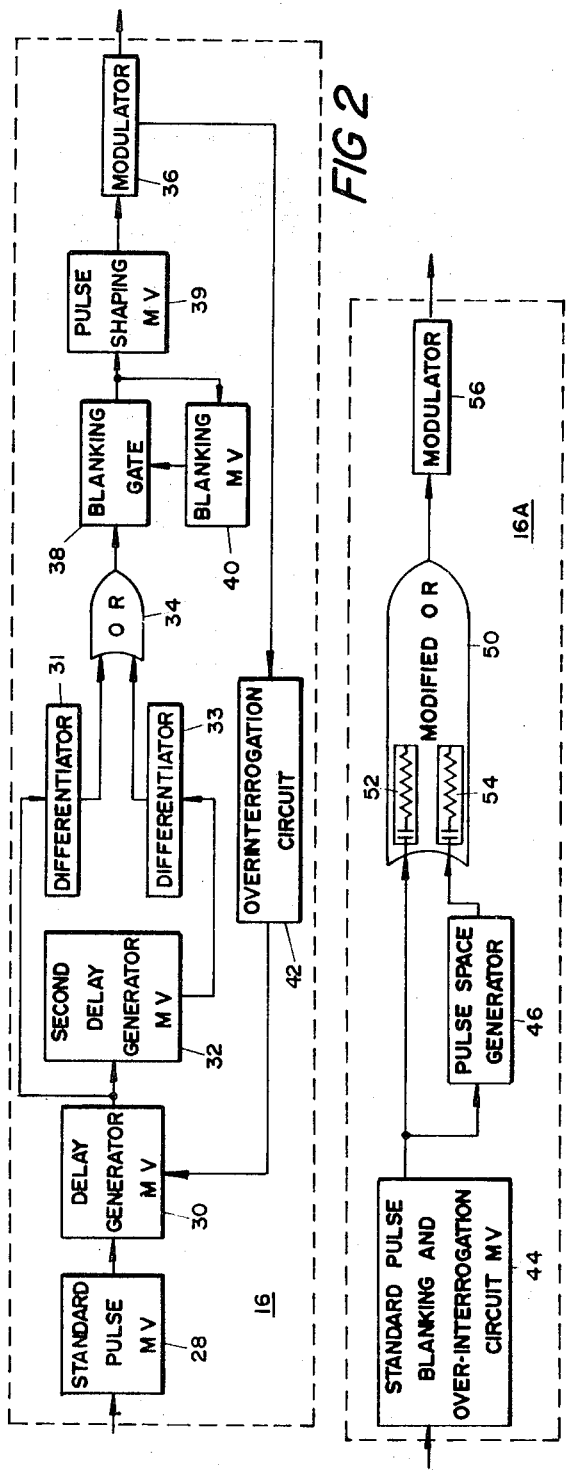

MINIMUM SIZE TRANSPONDER

BACKGROUND

It is advantageous for a person who is lost or who is separated from his companions or who is in unfriendly territory to have a signalling device to indicate his presence and to give information as to his identity. Such a signalling device may be a radio transmitter. Since radio waves can be traced to their source if they are emitted for a long enough period of time, and since this can be dangerous in hostile territory, the radio transmitter should transmit only for a short time and then only when friends are within signalling distance. The transmitted signals should be coded to indicate who is holding the transmitter. Such a radio device is called a radar transponder, that is a transmitter which sends out pulses that are coded in response to received pulses, such as the pulses transmitted by radar equipment. However, prior art transponders are bulky, whereby supplying a transponder for each person and having each person individually carrying his transponder may be inconvenient and may require leaving behind other necessary personal equipment.

It is an object of this invention to provide an improved transponder.

It is a further object of this invention to provide a transponder whose circuit requirements are minimized, whereby the transponder is of minimum size.

SUMMARY

In accordance with this invention, circuits are provided which perform the standard functions required of a transponder even though the circuits that are provided are minimized. For example, upon receipt of a pulse by the transponder, a long pulse is produced which is so long that it still continues while the reply pulse is sent out, and for sufficient length of time afterwards to prevent "ring-around." Also, the long pulse is equal in length to the reciprocal of the highest permitted rate pulse frequency, whereby received pulses which would trigger the transponder to produce reply pulses at too high a rate cause no reply pulse. The remaining pulses in the same pulse train continue to cause reply pulses up to the maximum permitted reply rate. Furthermore, one multivibrator and a space generator and a modified OR circuit produce all the results that five multivibrators, an OR circuit, a gate circuit and an overinterrogation circuit produces in the known transponder, greatly cutting down on the circuitry required for proper operation of the disclosed transponder.

Figure 4:
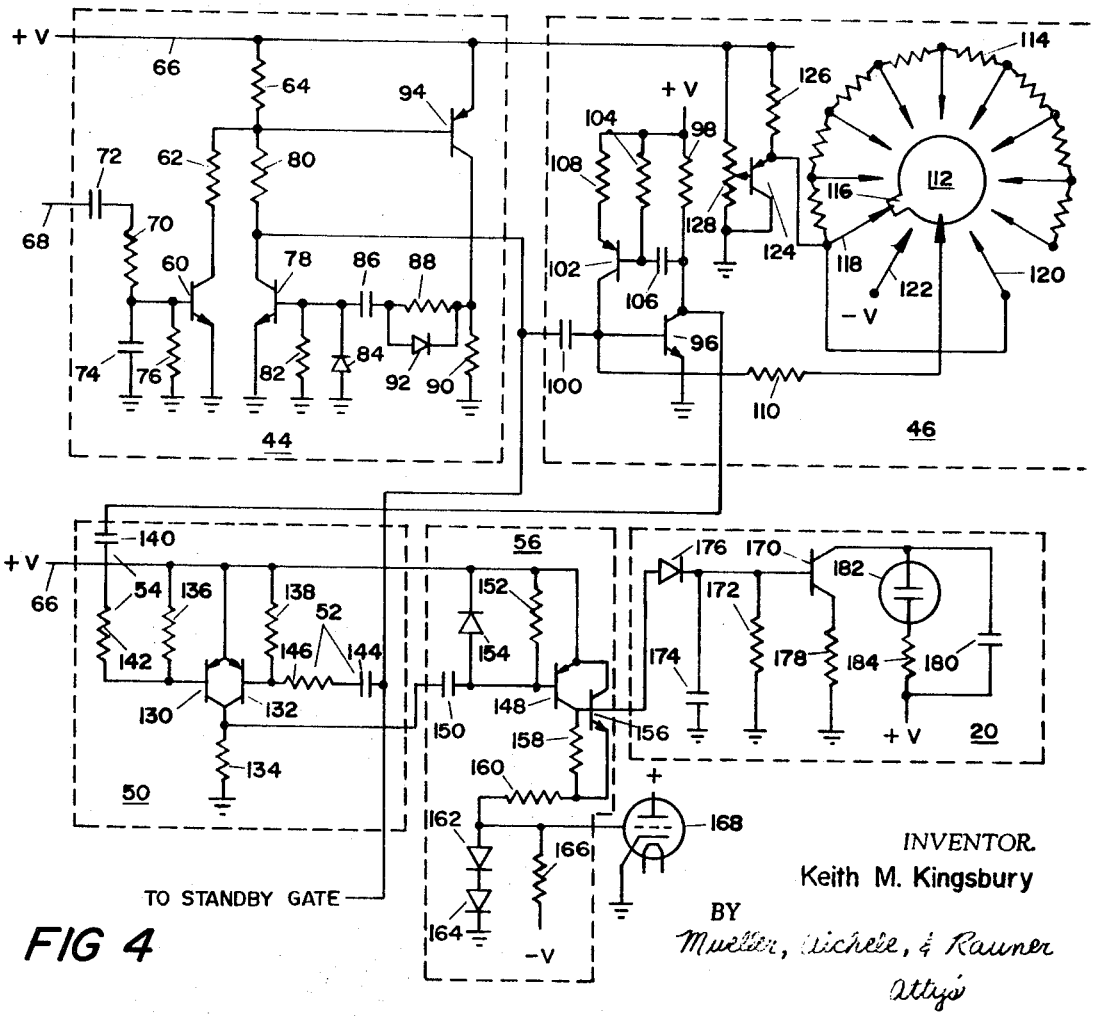

The invention will be better understood upon reading the following description in connection with accompanying drawing in which FIG. 1 is a block diagram of a transponder, FIG. 2 is a block diagram of the video processing circuit portions of the block diagram of FIG. 1 according to the prior art, FIG. 3 is a block diagram of a transponder video processing circuit portion of the block diagram of FIG. 1 according to this invention, FIG. 4 is a schematic circuit diagram of the blocks of FIG. 3, and FIG. 5 are curves that are useful in explaining the operation of the elements comprising the rectangle 16A of FIG. 3.

In the transponder block diagram of FIG. 1, electromagnetic waves are picked up by an antenna 10. If within the proper frequency band, the waves are detected in the radio frequency receiver portion of the block 12. The detected wave produced in the block 12 is applied to a video amplifier 14 and output of the video amplifier 14 is applied to video processing circuits 16, which in general, produces the reply pulses at controllably varying spacing, to be applied to the transmitter 18, the output of which is in turn applied to the radio frequency circuits 12 to be radiated by the antenna 10. The video processing circuit 16 may include protective means and means to produce continuous pulses, if the transponder is to be used as a beacon. A lamp circuit 20 may be provided if desired, to indicate to the user that the transponder is transmitting. Voltage is applied by a battery, not shown, To a voltage regulator 22 which supplies the radio frequency circuit 12, the video amplifier 14 and the video processing circuits 16, these circuits being alive as long as the transponder is on. A standby gate 24 may be provided to save current. Since there may be no transmission by the transponder unless a wave is received thereby, the lamp driver 20 and the transmitter 18 may be energized by way of the standby gate 24 only if a wave is received in the video processing circuits 16 and applied to the standby gate 24 to turn it on. A DC to DC converter 26 is provided since the lamp driver 20 and parts of the transmitter 18 and even parts of the standby gate 24 itself may require voltages that are different in polarity or in value than those provided by the voltage regulator 22.

The disclosed invention relates to the contents of the block 16 labelled "video processing circuits" and to its cooperation with the remainder of the circuit of FIG. 1. To emphasize the inventive difference between the presently disclosed invention and the prior art, the contents according to the prior art of the rectangle 16 is disclosed in FIG. 2. Disclosure of the present invention is made in FIGS. 3 and 4 and the explanation thereof.

The output of the video circuit 14 is a pulse as received by the antenna 10. This pulse is applied to the video processing circuits 16 of FIGS. 1 and 2. In FIG. 2, the pulse produced by the video amplifier 14 is applied to a standard pulse multivibrator (hereinafter MV) 28 which produces at its output a narrow pulse of standard duration or width and standard amplitude or voltage. The MV 28 produces one output pulse for one input pulse. The output of the standard MV 28 is applied to a first delay generating MV 30 and the output of the MV 30 is applied to a second delay generating MV 32. Each of the MVs 30 and 32 produces a discrete pulse of constant uniform width and amplitude, the pulse from MV 32 being delayed in that the latter pulse occurs at the trailing edge of the former. Differentiating networks 31 and 33 following the outputs of MV 30 and MV 32 respectively form a narrow spike at each network 31 and 33 corresponding to the trailing edge of the respective input pulse. These narrow spikes are applied to an OR circuit 34, the spacing therebetween being adjustable by varying the delay provided by the second delay generator 32. Therefore, two discrete narrow triggering pulses of the same width and amplitude but of variable spacing appear at the output of the OR circuit 34, which is fed by the differentiated output of both of the delay generator MVs 30 and 32, for each pulse applied to the standard MV 28. The output of the OR 34 is applied to a pulse shaping MV 39 by way of a blanking circuit 38. MV 39 produces a pulse for each input triggering pulse, each pulse having a fixed amplitude and a pulse width corresponding to the desired pulse width of the transmitter RF reply pulse. These shaped pulses are applied to the modulator 36. The output of the modulator 36 is applied to the transmitter 18 of FIG. 1 and if desired, to the lamp driver 20. The transmitter 18 provides a high amplitude RF pulse for transmission and applies it to the antenna 10 for radiation by way of the RF circuit 12. The transmitted pulse from the antenna 10 will arrive, through leakage paths in the RF circuits 12, at the standard pulse MV 28 with sufficient amplitude to trigger it, whereby the transponder of FIG. 1 would lock up in a continuous self-triggering mode commonly called "ring-around." To prevent this ringing, the pulse at the output of the blanking gate 38 is applied to a blanking MV 40, which, for each input pulse produces an output pulse which has a width equal to the minimum spacing of the pulses applied to the input of the blanking gate 38 by the OR 34, whereby the pulse transmitted by the antenna 10 is over before the blanking gate 38 is again opened and ring-around is prevented. However, the transmitter 18 includes a tube which can produce high power pulses a radio frequency to be transmitted only up to a certain pulse rate frequency, and if this pulse rate frequency is exceeded, the transmitter tube may be destroyed. To protect the transmitter tube, the overinterrogation circuit 42 is provided.

The overinterrogation circuit 42 is an averaging circuit to which all the pulses produced in the modulator 36 are applied. If this averages below a threshold, there is no voltage from overinterrogation circuit 42 and the delay MV 30 is allowed to produce one pulse for each one applied thereto. However, if the modulator 36 produces too many pulses in a time period, the average current goes up in the over interrogation circuit 42 and after the current therein exceeds a threshold, the output of the circuit 42 blocks the delay generating MV 30 for as long as the current in the circuit 42 exceeds the threshold. Therefore, the pulses sent out by the modulator 36 and supplied to the transmitter tube cannot exceed the safe pulse rate for the transmitter tube, no matter how many pulses are received by the antenna 10. It is noted then that the circuit 16 produces (1) standard pulses on a one to one basis with received pulses, (2) produces two delay pulses for each standard pulse, the width and amplitude of the delay pulses being constant and the spacing between them being adjustable (3) prevents ringing and (4) prevents overinterrogation. In accordance with this invention, the block diagram 16A of FIG. 3 does all that the block diagram 16 of FIG. 2 does and uses much less circuitry, requiring less space and permitting the building of a small transponder.

In FIG. 3, the first block 44 in the dotted rectangle 16A, which takes the place of the block 16 of FIG. 1, performs the functions of (1) providing a standard pulse, (2) acting as a blanking gate to prevent ringing and (3) acts as an overinterrogation control to protect the transmitter tube which is part of the transmitter. This is accomplished because the output pulse produced by the MV 44 is very wide. The pulse applied to the MV 44 by the video amplifier 14 starts the wide output pulse and, as will be explained, the transmitter 18 applies a pulse to the antenna 10. This pulse gets back to the MV 44 by way of the video amplifier 14 and would cause ring-around. However, since the MV 44 has already been triggered and its pulse is not completed, the pulse applied to the input of the MV 44 due to the transmitted pulse from the antenna 10 cannot affect the MV 44. Therefore, since the length of the pulse produced by the MV 44 is greater than the time it takes for a transmitted pulse to get back to the MV 44, ringing is prevented. Furthermore, the length of the pulse produced by the MV 44 also causes it to act as an overinterrogation control. If, before the end of the pulse produced by the MV 44, another pulse is received by the antenna 10 and applied by way of the video amplifier 14 to the MV 44, and the MV 44 cannot respond thereto. The width of the output pulse produced by the MV 44 is set at the reciprocal of the maximum safe pulse rate frequency for the transmitter tube comprising part of the transmitter 18, whereby the transmitter tube cannot be pulsed at a rate higher than the maximum safe pulse rate and the transmitter tube is protected from harm due to over interrogation by action of the MV 44.

The double pulse with an adjustable spacing therebetween is produced by the MV circuit 44 and a pulse space generator 46 and a modified OR circuit 50 which includes respective timing circuits 52 and 54 in each of its two input connections. The output of the MV 44 feeds into the modified OR 50 through the timing circuit 52 and also into the space generator 46. The output of the space generator 46 feeds into the modified OR 50 by way of the timing circuit 54. The pulse produced by the MV 44 circuit is negative. When the leading edge of this negative pulse is applied to the space generator 46, a positive pulse is produced thereby, the duration of which can be controlled. The leading negative going edge of the negative pulse produced by the MV 44 causes the application of a pulse to one input of the modified OR circuit 50 due to the action of the timing circuit 52. The negative going trailing edge of the positive pulse produced by the space generator 46, which is an adjustable time after the beginning of the pulse produced by the space generator 46, also produces a pulse in the modified OR 50 due to the operation of the timing circuit 54. The result is that for each pulse applied to the input of the MV circuit 44, two pulses of constant amplitude and of the same duration appear at the output of the modified OR 50, both the spacing between these pulses and their pulse widths (as will be explained) being adjustable. The output of the modified OR is applied to the modulator 56 which, as in the circuit of FIG. 2, applies pulses of constant and equal amplitude and constant and equal length to the transmitter 18, the spacing and output pulse width being adjustable, and there also being no ring around and no possibility of overload of the transmitter tube. However, unlike in the circuit of FIG. 2, the output pulse width of modulator 56 is determined by the modulator independent of the pulse width at its input due to the time constant of the resistor 134 and the capacitor 150. Furthermore, (unlike the modulator 36 of FIG. 2), since the modulator 56 is triggered on by the trailing edge of the positive pulses applied thereto, the pulse output of the modulator 56 is delayed with respect to the input thereof, providing the delay between the received pulse and the first of the two reply pulses sent out in response thereto, and adding the same delay to the second reply pulse. It is noted that the circuit 16A of FIG. 3 performs all the functions of the circuit 16 of FIG. 2, however, a delay generating MV 30, an overinterrogation circuit 42, a blanking gate 38, a blanking MV 40, and a pulse shaping MV 39 are omitted. The circuit 16A will take much less room than a circuit 16 of FIG. 2, whereby a transponder including the circuit 16A instead of the circuit 16, will require less room than the known transponders.

The contents of block 42, 46 and 50 of FIG. 2 are shown in FIG. 4. FIG. 4 also shows the modulator 56 of FIGS. 2 and 3 and the lamp driver 20 of FIG. 1.

The MV 44 comprises a first NPN transistor 60 whose collector is connected by way of series resistors 62 and 64 to a power line 66. The base of the transistor 60 is connected to an input terminal 68 by way of a resistor 70 and a capacitor 72 in series. The base of the transistor 60 is connected to ground by way of a capacitor 74 and a resistor 76 connected in parallel. The emitter of the transistor 60 is connected directly to ground. The emitter of a second transistor 78 is connected to ground. The collector of the second NPN transistor 78 is connected to the junction of the resistors 62 and 64 by way of a resistor 80. The base of the transistor 78 is connected to ground through a resistor 82 and to the cathode of a diode 84 whose anode is connected to ground, and through a capacitor 86 and a resistor 88 and a resistor 90 to ground, the elements 86, 88 and 90 being connected in series. The junction of the capacitor 86 and the resistor 88 is connected to the anode of a diode 92. The cathode of the diode 92 is connected to the junction of the resistors 88 and 90. The emitter of a PNP transistor 94 is connected to the power line 66 and the base of the transistor 94 is connected to the junction of the resistors 62 and 80. The collector of the transistor 94 is connected to the junction of the resistors 88 and 90.

In its steady state, between pulses applied to the input terminal 68, the transistors 60, 78 and 94 are not conductive. When a positive going pulse appears at the terminal 68, the capacitor 74 is charged and the transistor 60 is turned on. Current flows through the resistors 64 and 62 in series, whereby the base of the transistor 94 becomes negative with respect to its emitter and the transistor 94 becomes conductive. The transistor 78, at this moment, is off. Also, the voltage across the capacitor 86 is zero. Current flows through the resistor 90 and charges the capacitor 86. As the capacitor 86 is charging to the potential of the line 66, the transistor 78 conducts. As soon as the charge across the capacitor 86 is that of the line 66, whereby the capacitor 86 is no longer charging, the transistor 78 no longer conducts. It takes about 500 microseconds for the capacitor 86 to be fully charged and the input pulse at the terminal 68 has been over for some time, and the transistor 60 has long ceased conducting. When the transistor 78 (as well as the transistor 60) ceases to conduct, there is no base current for the transistor 94 and no current flow through the resistor 90 and the capacitor 86 discharges very rapidly by way of the two diodes 84 and 92 and the resistor 90 and the circuit 44 is again quiescent, ready to react to the next pulse applied to the terminal 68. If, as noted above, another positive going pulse, be it due to ring-around or due to a received pulse, is applied to the terminal 68 while the transistors 94 and 78 are conductive, there is no response to the ring-around or to the received pulse. The output of the MV 44 is at the collector of the transistor 78, whereby the output of the MV 44 is a negative going pulse. The output of the MV 44 appearing at the collector of the transistor 78 is applied to the modified OR 50 and also to the space generator 46.

The space generator 46 comprises a first NPN transistor 96 whose collector is connected to a source of supply by way of a resistor 98. The base of the transistor 96 is connected through a capacitor 100 to the output of the MV 44. The emitter of the transistor 96 is connected to ground. The base of a PNP transistor 102 is connected through a resistor 104 to the source of supply and through a capacitor 106 to the collector of the transistor 96. The emitter of the transistor 102 is connected to the source of supply through a resistor 108. The collector of the transistor 102 is connected to the base of the transistor 96. The base of the transistor 96 is connected by way of the resistor 110 to a rotary contact 112. A resistor 114 having several taps thereon is so arranged that upon rotation of the contact 112, a tab portion 116 of the contact 112 contacts successive taps on the resistor 114. A contact 118 on the resistor 114 is directly connected to a spaced contact 120. A contact 122 is connected to a negative source of potential. The emitter of a PNP transistor 124 is connected to contact 118 on the resistor 114 and through a resistor 126 to the supply line 66. The collector of the transistor 124 is connected to the grounded end of a potentiometer resistor 128. The other end of the potentiometer resistor 128 is connected to the supply lines 66. The base of the transistor 124 is connected to a variable tap on the potentiometer 128. The output of the space generator 46, which is the collector of the transistor 96, is connected to the modified OR 50.

In its quiescent condition with rotary contact 112 set at one of the double pulse positions as shown, the transistor 96 is conductive since its base is connected by way of the resistor 110 and an adjustable part of the resistor 114 and the transistor 124 and the resistor 126 to a positive potential. The transistor 124 acts as a temperature compensating voltage regulator. The transistor 102 is nonconductive. Also, the capacitor 100 is charged, the left plate as viewed in FIG. 4 of the capacitor 10 being charged to the potential of the line 66 and the right plate of the capacitor 100 being one diode drop (that between the base and emitter of the transistor 96) above ground. The negative leading edge of the negative pulse produced by the MV 44 is applied to the left plate of the capacitor 100. The transistor 96 is turned off. The charge on the capacitor 100 changes in that the potential of its left plate drops almost to ground, whereby the right plate becomes negative with respect to ground by the amount of drop of the left plate, the transistor 96 remaining off. The right plate of the capacitor 100 begins to charge positive due to the line 66, by way of the resistor 126 and the transistor 124, the tap on the resistor 114 and the resistor 110. When the right plate 100 becomes one diode drop more positive than ground, the transistor 96 goes on. A voltage drop develops across the resistor 98 and the transistor 102 goes on momentarily hastening the turning on the transistor 96 to quickly end the positive going pulse on the collector of the transistor 96. The length of the positive pulse produced by the space generator 48 is determined by the setting of the tab 116. At the position 120, by means not shown, the video amplifier 14 becomes an oscillator and paired pulses are produced continuously by the MV 44 and the space generator 46 at a rate determined by the pulse rate of the oscillator (not shown) and at a spacing determined by the resistance value 110 and tap 120 on the resistor 114. When the tap 116 contacts the tap 122, negative voltage is applied to the base of the transistor 96, rendering it nonconductive at all times, whereby the space generator 46 is inoperative and there is a pulse for pulse response by the means 16A (of FIG. 3) to the pulses received at the antenna 10, instead of a two pulse response for each pulse received by the antenna 10 when the tab 116 is not in contact with the contact 122. For all other positions of the tab 116, as will be further explained, two pulses are transmitted by the antenna 10 for each pulse received thereby, the transmitted pulses being uniform in width and in amplitude and of a spacing determined by the tap on the resistor 114.

The modified OR 50 comprises two PNP transistors 130 and 132 having their emitters connected together and to the power supply line 66 and having their collectors connected to ground by way of a resistor 134. The bases of the transistors 130 and 132 are connected to the power supply lines 66 through respective resistors 136 and 138. The output of the space generator 46 is connected to the base of the transistor 130 by way of a capacitor 140 and a resistor 142 in series comprising the timing differentiator 54. The output of the MV 44 is connected to the base of the transistor 132 by way of the capacitor 144 and a resistor 146 in series comprising the timing differentiator 52. Positive going edges of a pulse from the output of the MV 44 and from the space generator 46 do not affect the modified OR 50. Negative going edges of the pulses render the corresponding transistors 130 and 132 conductive, but only for a short time of uniform duration due to the action of the respective time constant circuits 54 for the transistor 130 and 52 for the transistor 132. Since the output of the MV 44 is a negative pulse, its leading edge triggers the transistor 132. Since the output of the space transistor 46 is the positive pulse, its trailing edge triggers the transistor 130. The output of the modified OR 50 appears at the connected collectors of the transistors 130 and 132, which is connected to the modulator 56. Therefore, two positive pulses of uniform duration appear at the collector of the transistors 130 and 132, each time a negative going edge of a pulse is applied to either differentiator 52 or 54 and the space between the two positive pulses depends on the length of the pulse produced by the space generator 46.

The modulator 56 comprises a PNP transistor 48 whose base is connected by way of pulse width timing capacitor 150 to the output of the modified OR 50. The base of the transistor 148 is also connected through a resistor 152 to the supply line 66 and to the anode of a diode 154 whose cathode is connected to the line 66. The emitter of the transistor 148 is also connected to the line 66 and to the collector of an NPN transistor 156. The collector of the transistor 148 is connected to the base of the transistor 156 and through two resistors 158 and 160 in series to the anode of a diode 162. The cathode of the diode 162 is connected to the anode of diode 164 whose cathode is connected to ground. A resistor 166 is connected between the junction of the resistor 160 and the diode 162 and a source of negative bias. The emitter of the transistor 156 is connected to the junction of the resistors 158 and 160. An output for the modulator 56 appears at the collector of the transistor 148 to be applied to lamp driver 20. Another output of the modulator 56 appears at the junction of the resistor 160 and the diode 162 to cause pulsing of the transmitter tube 168 of the transmitter 18.

The modulator 56 triggers at respective negative going edges of positive pulses applied thereto. Since positive pulses are applied thereto by the modified OR 50, the modulator 56 provides one pulse for each pulse applied thereto delayed, however, by the width of the positive pulse applied thereto. In its quiescent condition, when no pulse is applied to the modulator 56, the left plate of the capacitor 150, as viewed in FIG. 4, is at ground potential and the right plate thereof is at the potential of the supply line 66. The transistor 148 is off. One of the transistors 130 or 132 becomes conductive and the capacitor 150 discharges rapidly by way of the diode 154 and the transistor 130 or 132 that is conductive. Voltage across the capacitor 150 becomes zero. At the end of the pulse from the modified OR 50, that is when both transistors 130 and 132 become nonconductive, current flows into the capacitor 150 through the resistor 152 causing conduction of the transistor 148. The conduction of the transistor 148 continues until the capacitor 150 is fully charged, whereby the duration of conductivity of the transistor 148 is determined by the time constant of the resistor 134 and the capacitor 150. The transistors 148 and 156 are a two stage amplifier. Therefore, at the negative trailing edges of the pulses applied to the modulator 56 by the modified OR 50, pulses of constant duration and amplitude are applied to the transmitter tube 168. Due to the response to the trailing edge of the positive pulses by the modulator 56, the desired delay between the received pulse and the response pulse is provided. Furthermore, due to the time constant of resistor 134 and capacitor 150, the desired output pulse width is provided.

The lamp driver 20 comprises an NPN transistor 170 whose base is connected to ground by way of a resistor 172 and a capacitor 174 in parallel and to the cathode of a diode 176 whose anode is connected to the collector of the transistor 148. The emitter of the transistor 170 is connected to ground through a resistor 178. The collector of the transistor 170 is connected to a positive terminal by way of a capacitor 180, a light such as a neon lamp 182 and a resistor 184 being connected in series with the lamp 182 across the capacitor 180. Each time a positive pulse is applied to the anode of the diode 176 from the modulator 56, the capacitor 174 charges and the transistor 170 is made conductive and the lamp 182 lights up. By persistence of vision, if the pulses are applied to the diode 176 at a high enough rate, the lamp 170 appears to be on continuously.

FIG. 5 may also be referred to for an understanding of the elements of FIG. 3 which are shown in more detail in FIG. 4. The curve 200 is produced by the standard pulse blanking and over-interrogation circuit MV 44, the wave 200 going down as shown when a pulse is applied to the input thereof. The wave 200 goes up again after a period determined as indicated above. The down going portion of the wave 200 causes the positive going pulse 202 to be produced by the pulse space generator 46. It will be noted that the pulse 202 is much shorter than the pulse 200. The modified OR 50 responds only to negative going portions of waves applied thereto, whereby the pulse 204 results at the output of the modified OR 50 due to the downgoing part of the pulse 200 and the pulse 206 results at the output of the modified OR 50 due to the downgoing part of pulse 202. The trailing edges 208 and 210 of the pulses 204 and 206 respectively is due to the action of the capacitor 150 and the resistor 134, see FIG. 4. When both of the transistors 130 and 132 are nonconductive, the capacitor 150 is charged, that is, its left plate (as viewed in FIG. 4) is at ground and its right plate is at +V potential. When either transistor 132 or 130 is made conductive by application of a negative going voltage, thereto from the MV 44 or 46, the left plate of the capacitor 150 is connected to +V and both plates of the capacitor 150 become equally positive, that is the capacitor 150 discharges through the diode 154. As soon as both transistors 130 and 132 again are nonconductive, the capacitor 150 charges again, that is the left plate thereof goes to zero along the line 208 or 210. The shape of the curve 208 and 210 depends on the time constant of the resistor 134 and the capacitor 150. The pulse output 212 and 214 of the modulator 56 is produced only while the capacitor 150 is charging. Therefore, the pulse output 212 and 214 depend in duration on the time constant of the capacitor 150 and the resistor 134. Also, the modulator output pulses 212 and 214 are each delayed after the negative going portions of the pulses 200 and 202 by the time constants of the time constant circuits 52 and 54 respectively.

What is claimed is:

1. In a transponder comprising a pulse receiver and a pulse transmitter,
    means responsive to a pulse received by said transponder to start the production of a long pulse,
    means responsive to the beginning of the pulse produced by said long pulse producer to produce a second pulse which is shorter than said first pulse,
    means to vary the length of said second pulse,
    means responsive to the beginning of the pulse produced by said long pulse producer to produce a pulse of unvarying amplitude and width, and
    means responsive to the ending of the pulse produced by said second pulse producer to produce a pulse of unvarying amplitude and width, the spacing between said unvarying pulses being determined by the length of said second pulse.

2. The invention of claim 1 in which said transponder includes a pulse transmitter which will be harmed if operated at too high a pulse rate, said pulse produced by said long pulse producer being equal in length to the reciprocal of the safe pulse rate for said transmitter.

3. The invention of claim 1 in which said means responsive to the beginning of said long pulse and the means responsive to the end of said second pulse are respective timing differentiating circuits.

4. The invention of claim 1 in which a modulator is provided and in which means are provided to apply said unvarying pulses to the input of said modulator and in which said modulator includes means whereby delayed pulses are produced by said modulator in response to pulses applied thereto.

5. Video processing apparatus comprising
    means to produce a long pulse in response to an applied pulse,
    means to produce a second pulse starting at the beginning of said long pulse, said pulses being of opposite polarity and,
    means to apply said pulses to individual timing differentiating circuits.

6. The invention of claim 5 in which means are included to vary the length of said second pulse.

7. The invention of claim 5 in which a modified OR circuit is provided having two inputs and including said timing differentiating circuits as respective parts of the said inputs.

8. The invention of claim 7 in which a modulator is provided to which the outputs of said OR is connected and said modulator providing an output which is delayed with respect to the input applied thereto, and has a desired output pulse width.

* * * * *